US011512012B2

United States Patent
Chiang et al.

(10) Patent No.: US 11,512,012 B2
(45) Date of Patent: Nov. 29, 2022

(54) USE OF ELECTROCHEMICAL OXIDATION FOR TREATMENT OF PER-AND POLYFLUOROALKYL SUBSTANCES (PFAS) IN WASTE GENERATED FROM SORBENT AND RESIN REGENERATION PROCESSES

(71) Applicant: AECOM (DELAWARE CORPORATION), Los Angeles, CA (US)

(72) Inventors: Dora Sheau-Yun Chiang, Marietta, GA (US); Rachael A. Casson, Sydney (AU); Shangtao Liang, Richmond, CA (US)

(73) Assignee: AECOM, Los Angeles, CA (US)

( * ) Notice: Subject to any disclaimer, the term of this patent is extended or adjusted under 35 U.S.C. 154(b) by 0 days.

(21) Appl. No.: 16/331,005

(22) PCT Filed: Sep. 12, 2017

(86) PCT No.: PCT/US2017/051204
§ 371 (c)(1),
(2) Date: Mar. 6, 2019

(87) PCT Pub. No.: WO2018/097875
PCT Pub. Date: May 31, 2018

(65) Prior Publication Data
US 2019/0185352 A1  Jun. 20, 2019

Related U.S. Application Data

(60) Provisional application No. 62/393,389, filed on Sep. 12, 2016.

(51) Int. Cl.
C02F 1/467      (2006.01)
C02F 1/28       (2006.01)
(Continued)

(52) U.S. Cl.
CPC ............ *C02F 1/4672* (2013.01); *C02F 1/283* (2013.01); *C02F 1/42* (2013.01); *C02F 1/28* (2013.01);
(Continued)

(58) Field of Classification Search
CPC ............ B01J 49/50; B01J 49/53; B01J 49/57
See application file for complete search history.

(56) References Cited

U.S. PATENT DOCUMENTS 2,855,363 A * 10/1958 Kittredge ................. B01J 49/07
                                                              210/670
4,422,917 A    12/1983 Hayfield
(Continued)

FOREIGN PATENT DOCUMENTS

CA      2336507 A1    6/2006
EP    1 400 494 A2    3/2004
(Continued)

OTHER PUBLICATIONS

Appleman, Timothy D. et al., "Nanofiltration and granular activated carbon treatment of perfluoroalkyl acids," Journal of Hazardous Materials, 2013, vol. 260, pp. 740-746.
(Continued)

*Primary Examiner* — Jason M Greene
(74) *Attorney, Agent, or Firm* — Knobbe, Martens, Olson & Bear, LLP

(57) ABSTRACT

Perfluorinated and polyfluorinated compounds in an effluent stream are destroyed by means of electro-oxidation. Although electro-oxidation can be used to directly treat effluent, a more efficient use is to pre-concentrate applicable pollutants with filters or sorbents. Concentrated perfluorinated and polyfluorinated compounds are removed from the filter or sorbent with a regenerant solution and treated by electro-oxidation. A current density of 0.5 mA/cm$^2$ or 1
(Continued)

mA/cm² effectively reduces the level of perfluorinated contaminants within 1-3 hr. using a titanium electrode. This allows both the regenerant and filter or sorbent to be reused and greatly reduces the amount of material that must be treated as hazardous waste.

19 Claims, 3 Drawing Sheets

(51) Int. Cl.
*C02F 1/42* (2006.01)
*C02F 101/36* (2006.01)
*C02F 1/461* (2006.01)

(52) U.S. Cl.
CPC ............... *C02F 2001/46119* (2013.01); *C02F 2001/46133* (2013.01); *C02F 2101/36* (2013.01); *C02F 2201/4617* (2013.01); *C02F 2303/16* (2013.01)

(56) References Cited

U.S. PATENT DOCUMENTS

| | | | |
|---|---|---|---|
| 4,445,990 | A | 5/1984 | Kim et al. |
| 6,171,480 | B1 | 1/2001 | Lee et al. |
| 7,171,460 | B2 | 1/2007 | Kalavade et al. |
| 8,337,686 | B2 | 12/2012 | Hansen et al. |
| 8,894,834 | B2 | 11/2014 | Freydina et al. |
| 8,999,173 | B2 | 4/2015 | Schwartzel et al. |
| 2005/0221163 | A1 | 10/2005 | Yang et al. |
| 2007/0175766 | A1 | 8/2007 | Holmes et al. |
| 2008/0116136 | A1 | 5/2008 | Wilkins et al. |
| 2008/0245739 | A1* | 10/2008 | Honji ............ B01J 20/18 210/670 |
| 2011/0108438 | A1 | 5/2011 | Tretheway et al. |
| 2012/0055807 | A1* | 3/2012 | Fath ............ C02F 1/4672 205/756 |
| 2012/0211367 | A1 | 8/2012 | Vecitis |
| 2013/0299361 | A1 | 11/2013 | Wylie et al. |
| 2016/0207813 | A1 | 7/2016 | Szcesniak et al. |
| 2017/0036171 | A1 | 2/2017 | Lienhard et al. |
| 2017/0044031 | A1* | 2/2017 | Li ............ B01J 41/00 |
| 2019/0185351 | A1* | 6/2019 | Huang ............ C02F 1/46114 |
| 2020/0270148 | A1* | 8/2020 | Nickelsen ............ B01J 49/57 |

FOREIGN PATENT DOCUMENTS

| | | |
|---|---|---|
| JP | 2010-125352 | 6/2010 |
| WO | WO 2015/165234 A1 | 11/2015 |
| WO | WO 2018/035474 A1 | 2/2018 |
| WO | WO 2018/089751 A1 | 5/2018 |

OTHER PUBLICATIONS

Du, Ziwen et al., "Removal of perfluorinated carboxylates from washing wastewater of perfluorooctanesulfonyl fluoride using activated carbons and resins," Journal of Hazardous Materials, 2015, vol. 286, pp. 136-143.

Niu, Junfeng et al., "Electrochemical mineralization of perfluorocarboxylic acids (PFCAs) by Ce-doped modified porous nanocrystalline PbO2 film electrode," Environmental Science & Technology, 2012, vol. 46, pp. 10191-10198.

Yu, Qiang et al., "Sorption of perfluorooctance sulfonate and perfluorooctanoate on activated carbons and resin: Kinetic and isotherm study," Water Research, 2009, vol. 43, pp. 1150-1158.

Zaggia, Alessandro et al., "Use of strong anion exchange resins for the removal of perfluoroalkylated substances from contaminated drinking water in batch and continuous pilot plants," Water Research, 2016, vol. 91, pp. 137-146.

International Preliminary Report on Patentability dated Mar. 12, 2019 for International Application No. PCT/US2017/051204, 8 pages.

Yang, B. et al., "Highly efficient electrochemical degradation of perfluorooctanoic acid (PFOA) by F-doped Ti/SnO2 electrode," Journal of Hazardous Materials, Dec. 15, 2015, vol. 299, pp. 417-424.

Zhuo, Q. et al., "Degradation of perfluorinated compounds on a boron-doped diamond electrode," Electrochimica Acta, Aug. 30, 2012, vol. 77, pp. 17-22.

Guo et al., "Development and characterization of ultrafiltration TiO2 Magneli phase reactive electrochemical membranes," Environ. Sci. Technol., 2006, vol. 50, No. 3, pp. 1428-1436.

Liang Shangtao et al: "Electrochemical oxidation of PFOA and PFOS in concentrated waste streams", Remediation, vol. 28, No. 2, Mar. 1, 2018, pp. 127-134, XP055806689.

Hui Lin et al: "Development of macroporous Magneli phase Ti4O7 ceramic materials: As an efficient anode for mineralization of poly- and perfluoroalkyl substances", Chemical Engeneering Journal, vol. 354, Jul. 31, 2018, pp. 1058-1067, XP055699057.

* cited by examiner

USE OF ELECTROCHEMICAL OXIDATION FOR TREATMENT OF PER-AND POLYFLUOROALKYL SUBSTANCES (PFAS) IN WASTE GENERATED FROM SORBENT AND RESIN REGENERATION PROCESSES

CROSS-REFERENCE TO PRIOR APPLICATIONS

The current application is based on and claims the priority and benefit of U.S. Provisional Application No. 62/393,389, filed on 12 Sep. 2016.

U.S. GOVERNMENT SUPPORT

Not Applicable

BACKGROUND OF THE INVENTION

Area of the Art

The present invention is in the art of pollution control and more specifically is addressed to a proves for destroying fluorinated compounds in an aqueous waste stream.

Description of the Background Art

Per- and polyfluoroalkyl substances (PFAS) are organic compounds consisting of fluorine, carbon and heteroatoms such as oxygen, nitrogen and sulfur. The hydrophobicity of fluorocarbons and extreme electronegativity of fluorine give these and similar compounds unusual properties. Initially many of these compounds were used as gases in fabrication of integrated circuits. The ozone destroying properties of these molecules restricted their use and resulted in methods to prevent their release into the atmosphere. But other PFAS such as fluoro-surfactants have become increasingly popular. Although used in relatively small amounts, these compounds are readily released into the environment where their extreme hydrophobicity as well as negligible rates of natural decomposition results in environmental persistence and bioaccumulation. It appears as if even low levels of bioaccumulation may lead to serious health consequences for contaminated animals such as human beings, the young being especially susceptible. The environmental effects of these compounds on plants and microbes are as yet largely unknown. Nevertheless, serious efforts to limit the environmental release of PFAS are now commencing.

Sorption or filtration technologies have been commonly used to separate PFAS from impacted water (including waste water, surface water, drinking water and groundwater). The separation via sorbents or filters relies on sorption and other physical mechanisms that remove PFAS from water. The sorbents or filters (including ion exchange resin, reverse osmosis filters and activated carbon filters) will eventually become loaded with high concentrations of PFAS requiring regeneration of the sorbents or filters if they cannot be safely discharged or disposed of by other means. Such regeneration typically involves the use of chemical reagents to wash or release the PFAS from the "spent" sorbents or filters and results in the generation of a "spent regenerant." In some regeneration processes, "spent regenerants" can be reclaimed for reuse. Following the reclamation process, "still bottoms" or "regeneration wastes" will be generated. This invention applies to coupling a filtration technology with a destruction technology that will destroy PFAS in "spent regenerant", "still bottoms" or "regeneration wastes."

During the process, low concentrations of PFAS from high-volume impacted water become a low-volume high PFAS concentration waste stream; the PFAS mass is not changed, but the effective concentration is increased. The disposal of concentrated PFAS waste streams is not acceptable or is often cost-prohibitive (e.g., complex hazardous waste management). Therefore, a treatment technology that reduces the PFAS mass in "spent regenerant", "still bottoms" or "regeneration wastes" is needed to ensure removal of PFAS from the environment.

SUMMARY OF THE INVENTION

The present invention destroys PFAS in an effluent stream by means of electro-oxidation. Although the electro-oxidation process can be used to directly treat effluent, the huge volume of most contaminated effluents makes the use of electro-oxidation very inefficient. The present invention provides a more efficient system by using conventional effluent treatment systems to pre-concentrate applicable pollutants with ion exchange resin, activated carbon or similar filtration/sorbent materials. Thereafter the electro-oxidation system is used to reduce the more concentrated pollutant level in the "regenerant" used to flush the filtration/sorbent materials. This allows the regenerant to be reused and greatly reduces the amount of material that must be treated as hazardous waste. Moreover, the size of the electro-oxidation electrodes and the consumption of electricity is greatly reduced as compared to direct electro-oxidation of primary effluents.

For electro-oxidation current density of 0.5 $mA/cm^2$ or 1 $mA/cm^2$ can effectively reduce the level of per-fluorinated contaminants within 1-3 hr. using a titanium electrode or similar electrode. The process can operate in a variety of effluents provided a concentration of at least 10 mM salt is present. The effluent can be diluted to control the salt level as necessary. Besides fluorinated organic compounds, other organic compounds that contribute to TOC (total organic carbon) are also oxidized.

DETAILED DESCRIPTION OF THE INVENTION

Figure 1:
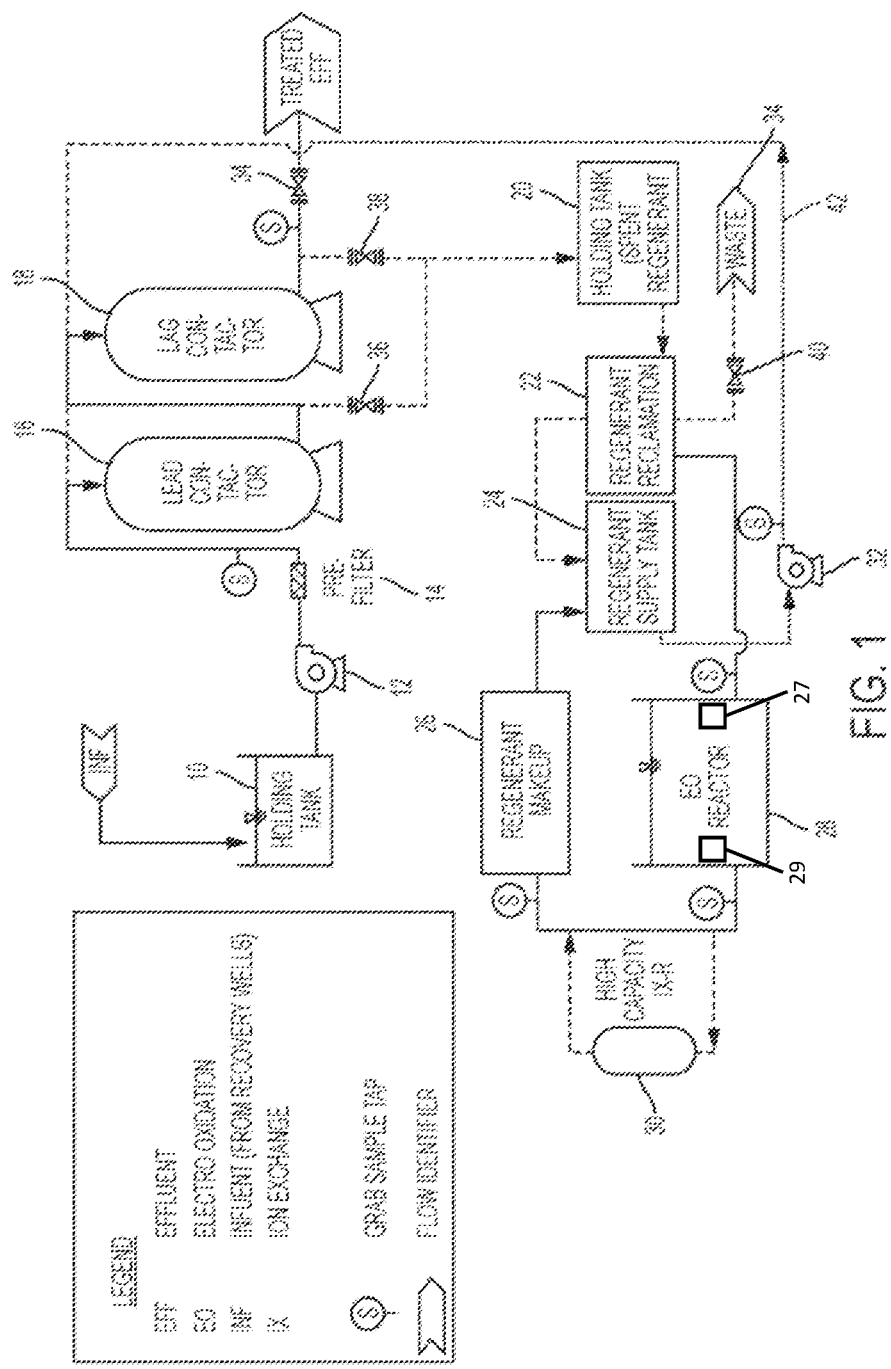
FIG. 1 is a diagram of the process of one embodiment of the invention.

The following description is provided to enable any person skilled in the art to make and use the invention and sets forth the best modes contemplated by the inventor of carrying out her invention. Various modifications, however, will remain readily apparent to those skilled in the art, since the general principles of the present invention have been defined herein specifically to provide a method to destroy perfluorinated compounds in waste streams.

The present invention couples a filtration technology with a destructive technology to remove and destroy and/or reduce the mass of PFAS in effluents. The destructive treatment process allows reuse of treatment effluent for filtration media regeneration or safe discharges and eliminates the need to ship waste offsite for disposal. There are several destructive technologies that have been studied at bench scale for PFAS destruction and mineralization. But the inventive process is the first to use electro-oxidative (EO) destructive technology for regeneration waste treatment. For example, EO can effectively degrade PFAS with a proven defluorination process to detoxify and destroy PFAS. The current invention is a new application of this destructive technology (particularly electrochemical oxidation technology) for treatment of concentrated PFAS in a waste stream generated from regeneration of any PFAS filtration technology.

The waste stream (including "spent regenerant", "still bottoms" or "regeneration waste") may contain organic solvents (e.g., methanol), concentrated PFAS, total organic carbon (TOC) in a salt solution. Both TOC and PFAS have been demonstrated to be destroyed by the destructive EO process. For instance, the use of titanium suboxide (e.g., $Ti_4O_7$) electrode with current density of 0.5 $mA/cm^2$ or 1 $mA/cm^2$ was able to destroy 100% of perfluorooctanesulfonate (PFOS) which is a fluoro-surfactant typically found spent regenerant. In such systems, an electrode surface area of approximately one square meter can cleanse 50 gallons (189 l) of spent regenerant (a salt concentration of about 10 mM is typically needed for the EO reactions) within 1-3 hours. The effluent of this EO process can be directly discharged or returned to the EO process for additional treatment.

Many different electrode combinations can be used in the invention. While the test was conducted with a titanium-based electrode known as "electrode T" (Magnéli phase Titanium sub oxide and mixed Magnéli phase Titanium oxide), other electrodes as shown in Table 1 are effective. The table demonstrates that preparation and composition of the electrode surface (e.g., nanoparticle surfaces, etc.) have a strong influence on overall defluorination. The rate constants and reaction half-lives of the most effective electrodes do not vary significantly.

TABLE 1

| Electrode | Defluorination ratio (%) | Rate constant (k, $min^{-1}$) | Half-life ($t_{1/2}$/min) | $R^2$ |
|---|---|---|---|---|
| $MnO_2$ | 14.6 | $0.4 \times 10^{-3}$ | 173.2 | 0.995 |
| $SnO_2$ | 65.8 | $2.5 \times 10^{-3}$ | 27.7 | 0.995 |
| modified $SnO_2$ | 73.7 | $2.9 \times 10^{-2}$ | 23.9 | 0.999 |
| $PbO_2$ | 70.5 | $2.7 \times 10^{-2}$ | 25.7 | 0.997 |
| Ce—$PbO_2$ | 76.9 | $3.1 \times 10^{-2}$ | 22.4 | 0.999 |
| modified Ce—$PbO_2$ | 92.6 | $3.9 \times 10^{-2}$ | 17.8 | 0.998 |
| Ebonex (titania ceramic) | 53.9 | $2.9 \times 10^{-2}$ | 23.9 | 0.997 |

The present invention couples EO with sorbent or filtration technologies that are used to remove PFAS from a waste stream as defined above. Electrode configuration and fluidic configuration will be apparent to one of skill in the art. The process can be performed as a batch reactor mode or continuous flow through in which case various fluidic and geometric parameters can be adjusted to ensure mixing and avoid lamellar flow and other surface effects. The process can also be carried out in a batch mode in which case standard mixing devices (impellers, etc.) are used to ensure mixing.

FIG. 1 shows a typical overall water treatment system using ion exchange resin (Lead Contactor 16 and Lag Contactor 18) to remove PFOA, PFOS and similar pollutants. In normal operation, the influent is stored in holding tank 10 and pumped by a pump 12 through a pre-filter 14 and through a series of two ion exchange resin contactors 16 and 18 and through normally open valve 34 to be released as treated effluent. However, when sampling shows that the effectiveness of the ion exchange contactors is decreasing, they can be regenerated. Valve 34 is closed and valves 36 and/or 38 are opened while a pump 32 pumps regenerant from the supply tank 24 through the alternate route 42. This flushes pollutants from the contactors 16 and 18 which flow into a holding tank 20. When the contactors 16 and 18 are sufficiently renewed, the process flow returns to the initial configuration.

During regeneration, spent regenerant moves from the holding tank 20 to the regenerant reclamation tank 22. The reclaimed regenerant flows to the regenerant supply tank 24 for reuse as regenerant. "Still bottom" is generated from spent regenerant reclamation; the "still bottom" moves through the EO reactor 28 (including anode electrode 27 and cathode electrode 29) where the EO takes place. The EO processed regenerant can optionally be treated with ion exchange resin 30 and is held in the regenerant makeup tank 26 where various additives may be added before the regenerant moves to the regenerant supply tank 24 for reuse. The valve 40 can be used to discharge excess volumes of regenerant to waste 34.

Figure 2:
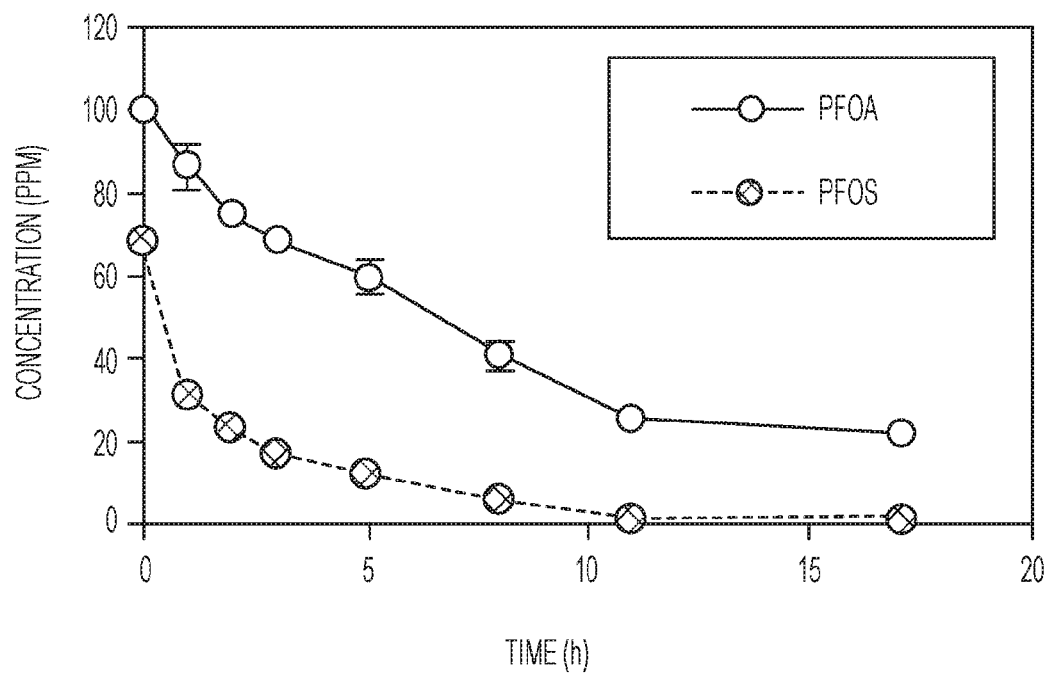
FIG. 2 is a graphic representation of the reduction in the level of perfluorinated compounds achieved by the present invention.

As shown in Table 2 below, two "still bottom" samples from the ion exchange regeneration process had an average of 6,810 mg/L TOC, 92 mg/L PFOA and 67.9 mg/L PFOS. (Parts-per-million, $10^{-6}$, is equivalent to mg/L.) After 17 hours of EO treatment, it was evident that the dark color of the still bottoms faded over time and PFOA and PFOS concentrations decreased sharply with 77.2% PFOA and 96.5% PFOS removed. The results of these experiments are shown graphically in FIG. 2.

TABLE 2

| Parameter | Sample 1 | Sample 2 |
|---|---|---|
| PFOA | 100.5 ppm | 83.5 ppm |
| PFOS | 68.6 ppm | 67.2 ppm |
| TOC | Very high | Very high |
| $Cl^-$ (Chloride) | Very high | Very high |

Figure 3:
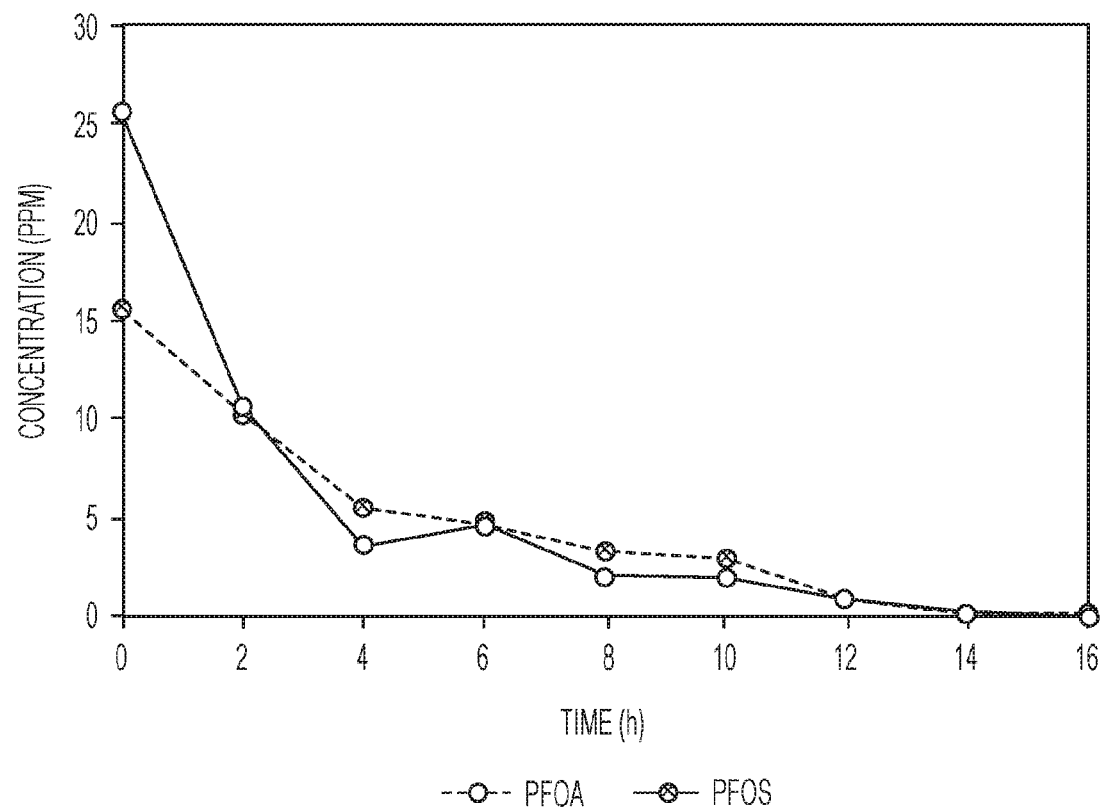
FIG. 3 is a graphic representation of the reduction in the level of perfluorinated compounds achieved by the present invention.

For another still bottom sample with relatively lower initial PFOA (15.6 mg/L perfluorooctanoic acid) and PFOS (25.4 mg/L perfluorooctanesulfonic acid) concentrations that are more typical in ion exchange resin operation, EO with the TI 4O7 electrode was able to completely remove them to non-detectable levels (detection limits of 33 parts-per-trillion, 10-12 for PFOA and 22 parts-per-trillion, 10-12 for PFOS) as shown graphically in FIG. 3. This demonstrates that that EO, according to our process, can be used to treat liquid wastes containing low to high PFAS concentrations as well as significant TOC and salt loads.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A process for destroying perfluoroalkyl and polyfluoroalkyl substances in a liquid stream by electro-oxidation, the process comprising:
concentrating the perfluoroalkyl and polyfluoroalkyl substances from the liquid stream using a filter or sorbent;
washing the filter or sorbent with a regenerant to generate a spent regenerant containing the concentrated perfluoroalkyl and polyfluoroalkyl substances;
generating still bottoms from the spent regenerant;
providing an electro-oxidative (EO) reactor comprising an electrolytic cell with an anode electrode and a cathode electrode, wherein at least one of the anode electrode and the cathode electrode comprises titanium suboxide;
continuously flowing the still bottoms through the EO reactor in a continuous flow through mode;
contacting at least the still bottoms with the anode electrode and the cathode electrode while a current of between 0.5 mA/cm$^2$ and 1 mA/cm$^2$ flows between said electrodes, thereby destroying at least some of the concentrated perfluoroalkyl and polyfluoroalkyl substances by electro-oxidation to form a reclaimed regenerant; and
reusing the reclaimed regenerant to wash the filter or sorbent.

2. The process of claim 1, wherein the anode electrode comprises titanium suboxide.

3. The process of claim 1 wherein the liquid stream is selected from the group consisting of waste water, surface water, drinking water and groundwater.

4. The process of claim 1, wherein the still bottoms continuously flowing through the electrolytic cell are electro-oxidized to destroy at least some concentrated perfluoroalkyl and polyfluoroalkyl substances in the still bottoms.

5. The process of claim 4 wherein the sorbent comprises an ion exchange resin.

6. The process of claim 1, wherein the anode electrode comprises a titanium-based electrode.

7. The process of claim 1, wherein, before contacting at least the still bottoms, the still bottoms contain at least 15.6 mg/L perfluorooctanoic acid (PFOA).

8. The process of claim 1, wherein contacting comprises destroying at least some perfluorooctanoic acid (PFOA) by electro-oxidation to form a reclaimed regenerant.

9. A water treatment system for destroying at least one of perfluoroalkyl and polyfluoroalkyl substances (PFAS) in a liquid stream by electro-oxidation, the water treatment system comprising:
a filter or sorbent for concentrating the at least one of perfluoroalkyl and polyfluoroalkyl substances from the liquid stream;
a pump for pumping regenerant from a supply tank to wash the filter or sorbent to generate a spent regenerant containing the concentrated perfluoroalkyl and polyfluoroalkyl substances;
a tank for generating still bottoms from the spent regenerant; and
a continuous flow through electro-oxidative (EO) reactor, comprising an electrolytic cell with an anode electrode and a cathode electrode, wherein the anode electrode and the cathode electrode are configured to contact at least the still bottoms while a current flows between the electrodes, thereby destroying at least some of the at least one of perfluoroalkyl and polyfluoroalkyl substances by electro-oxidation to form a reclaimed regenerant,
wherein at least one of the anode electrode and the cathode electrode comprises titanium suboxide; and
wherein the reclaimed regenerant is moved from the electrolytic cell to the supply tank to be reused to wash the filter or sorbent.

10. The water treatment system of claim 9, wherein the anode electrode comprises a titanium-based electrode.

11. The water treatment system of claim 10, wherein the anode electrode comprises titanium suboxide.

12. The water treatment system of claim 9, wherein the current flows between the electrodes with a current density between 0.5 mA/cm$^2$ and 1 mA/cm$^2$.

13. A process for destroying at least one of perfluoroalkyl and polyfluoroalkyl substances in a liquid stream by electro-oxidation, the process comprising:
concentrating the at least one of the perfluoroalkyl and polyfluoroalkyl substances from the liquid stream using a filter or sorbent;
washing the filter or sorbent with a regenerant to generate a spent regenerant containing the concentrated perfluoroalkyl and polyfluoroalkyl substances;
generating still bottoms from the spent regenerant;
continuously flowing the still bottoms through an electro-oxidative (EO) reactor in a continuous flow through mode;
contacting the at least the still bottoms with the EO reactor, comprising an electrolytic cell having an anode electrode and a cathode electrode, while a current flows between the electrodes, the contacting destroying at least some of the at least one of the perfluoroalkyl and polyfluoroalkyl substances by electro-oxidation to form a reclaimed regenerant, wherein at least one of the anode electrode and the cathode electrode comprises a titanium suboxide; and
reusing the reclaimed regenerant to wash the filter or sorbent.

14. The process of claim 13, wherein the still bottoms contain at least 15.6 mg/L perfluorooctanoic acid (PFOA).

15. The process of claim 13, wherein the anode electrode comprises a titanium-based electrode.

16. The process of claim 13, wherein the anode electrode comprises titanium suboxide.

17. The process of claim 1, further comprising:
flowing the liquid stream into a water treatment system; and
discharging at least some treated effluent from the EO reactor to outside the water treatment system.

18. The water treatment system of claim 9, wherein at least some treated effluent from the EO reactor is discharged to outside the water treatment system.

19. The process of claim 13, further comprising:
flowing the liquid stream into a water treatment system; and
discharging at least some treated effluent from the EO reactor to outside the water treatment system.

* * * * *